United States Patent [19]

Ueberschär

[11] Patent Number: 4,616,525
[45] Date of Patent: Oct. 14, 1986

[54] MULTI-STEP REDUCTION GEAR ATTACHMENT FOR MULTI-PURPOSE ELECTROMOTORS

[75] Inventor: Reinhard Ueberschär, Bielefeld, Fed. Rep. of Germany

[73] Assignee: Hanning Elektro-Werke GmbH & Co., Oerlinghausen, Fed. Rep. of Germany

[21] Appl. No.: 683,806

[22] Filed: Dec. 20, 1984

[30] Foreign Application Priority Data

Dec. 27, 1983 [DE] Fed. Rep. of Germany ....... 3347137

[51] Int. Cl.⁴ .............................................. F16H 57/02
[52] U.S. Cl. .................................. 74/606 R; 74/192; 74/397
[58] Field of Search ..................... 74/606 R, 840, 192, 74/397

[56] References Cited

U.S. PATENT DOCUMENTS 3,657,940  4/1972  Wagner ................................ 74/397
3,931,748  1/1976  Tertiuek ............................ 74/606 R
4,353,429  10/1982  Herron ........................ 74/606 R X
4,380,991  4/1983  Richter .............................. 74/397 X Primary Examiner—Harold Weakley
Attorney, Agent, or Firm—Max Fogiel

[57] ABSTRACT

A multistep reduction-gear attachment for multipurpose electric motors. Its casing-like gear box, whcih can be attached to a collar that surrounds the shaft of the motor and is intended for securing accessories, accommodates two axially parallel belt wheels or toothed wheels. One wheel is screwed onto the motor shaft, which engages inside the the gear box when the motor is in operation. The other wheel is screwed onto a drill spindle that is inserted into the gear box from the opposite side. To reduce manufacturing costs and simplify mounting accessories, the gear box (2) consist of two angled components (3), each flank (5) of which has at the end a chuck (6) for the collar (8) of the electric motor (1) or for the drill spindle (9) and which are secured together with means (4 & 13) of attachment that can be loosened in such a way that the components can move toward each other along said flank and the angled components, the belt wheels, and the wall plates (14) are similar to each other in shape.

6 Claims, 1 Drawing Figure

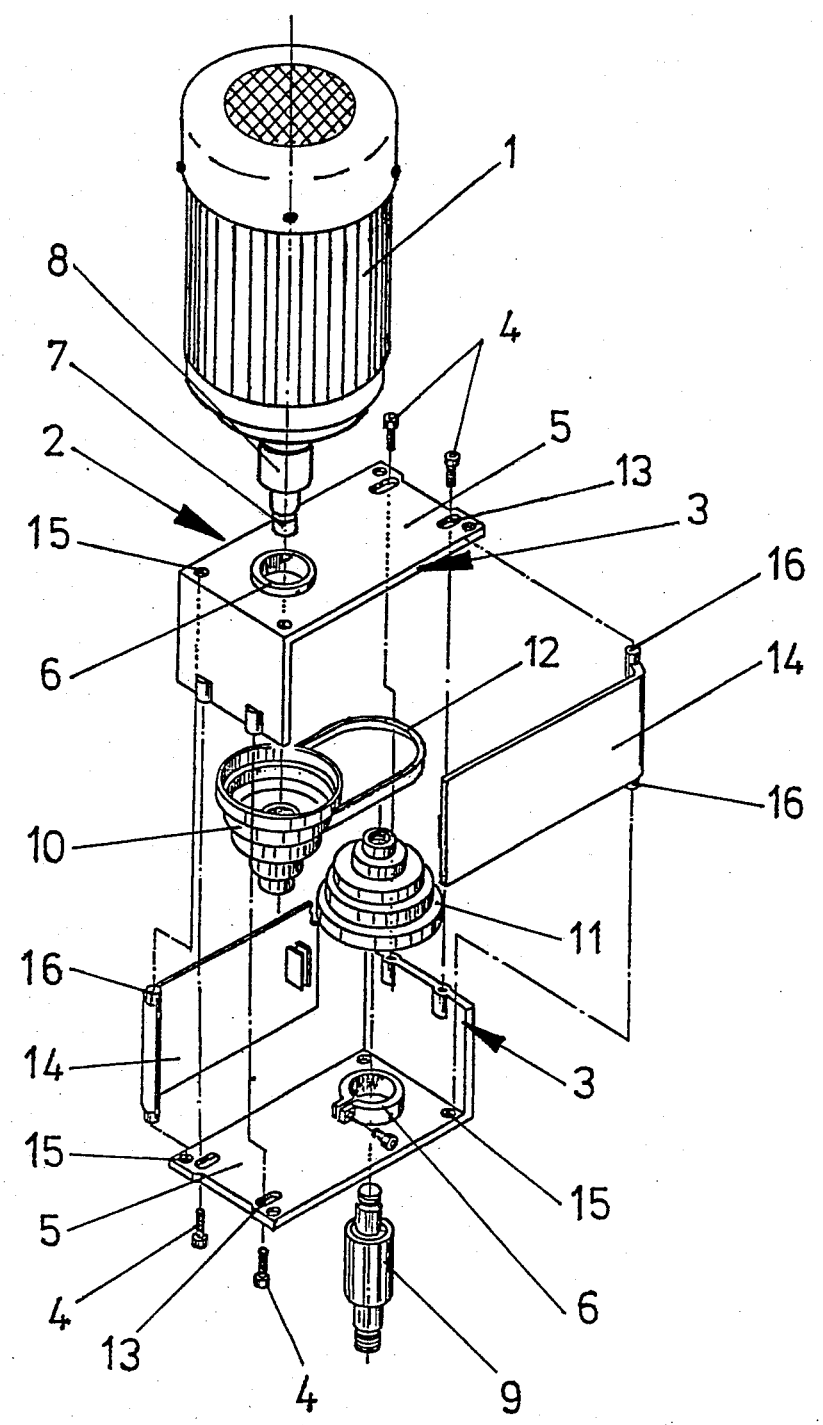

MULTI-STEP REDUCTION GEAR ATTACHMENT FOR MULTI-PURPOSE ELECTROMOTORS

The invention concerns a multistep reduction-gear attachment for multipurpose electric motors, with its casing-like gear box, which can be attached to a collar that surrounds the shaft of the motor and is intended for securing accessories, accommodating two axially parallel belt wheels or toothed wheels, of which one is screwed onto the motor shaft, which engages inside the the gear box when the motor is in operation, and the other onto a drill spindle that is inserted into the gear box from the opposite side.

Known attachments of this type are, like the drive assembly disclosed in German Utility Model No. 1 992 355, considerably expensive to manufacture, resulting in an unnecessarily high final price. This situation is in particular an essential drawback because the purchasers of such devices are mainly amateurs who need a tool that is as inexpensive as possible. Furthermore, it is difficult to sell the versions available up to the present time in conjunction with accessories because they are relatively difficult to assemble.

The object of the present invention is, in relation to the aforesaid state of the art, to provide a multistep reduction-gear attachment for multipurpose electric motors that is relatively inexpensive to manufacture and can be easily assembled from uniform components. It is also intended to simplify adjustment of belt tension.

How this object is attained in accordance with the invention will be evident from the claims.

One embodiment of the invention is illustrated in the drawing, which is an exploded view.

The illustrated multistep reduction-gear attachment for a multipurpose electric motor 1 has a casing-like gear box 2 that consists mainly of two similarly shaped angled components 3 fastened together with screws 4. One flank 5 of each component 3 has a chuck 6 at one end that, when a tool has been mounted, on the one hand secures gear box 2 to a collar 8 around the shaft 7 of electric motor 1 and on the other is connected to a drill spindle 9 that is inserted in gear box 2 axially parallel to the shaft.

A belt wheel 10 is screwed onto motor shaft 7, which engages inside gear box 2, opposite another and similarly shaped belt wheel 11, which is to be screwed onto drill spindle 9. Belt wheels 10 and 11 both have several gearing-up or gearing-down stages, to any of which a transmission belt 12 can be applied to obtain the particular speed desired at drill spindle 9.

To simplify adjusting the tension of transmission belt 12, the angled components 3 of gear box 2 should be capable of being moved toward each other along flanks 5. Angled components 3 are accordingly provided with slots 13, which accommodate screws 4 and allow the desired longitudinal motion when the screws are slightly loosened.

The sides of gear box 2, which is composed of the two angled components 3, are covered with wall plates 14, which have hinge pins 16 that can be mounted in recesses 15 in said components. These flap-like wall plates 14 are, like angled components 3 and belt wheels 10 and 11, designed to be similar in shape in order to reduce the number of differently shaped parts, which contributes to the low manufacturing costs that the invention is intended to achieve.

Toothed wheels for example can be employed in another version of the multistep reduction-gear attachment described herein instead of belt wheels 10 and 11. Making additional bores or contours available to angled components 3 or to the wall plates 14 attached to them so that they can accept other accessories as well if need be is also within the scope of the invention.

I claim:

1. Multistep reduction-gear attachment for multipurpose electric motors, with its casing-like gear box, which can be attached to a collar that surrounds the shaft of the motor and is intended for securing accessories, accommodating two axially parallel belt wheels or toothed wheels, of which one is screwed onto the motor shaft, which engages inside the the gear box when the motor is in operation, and the other onto a drill spindle that is inserted into the gear box from the opposite side, characterized in that the gear box (2) consists of two similarly shaped angled components (3), each flank (5) of which has at the end a chuck (6) for the collar (8) of the electric motor (1) or for the drill spindle (9) and which are secured together with means (4 & 13) of attachment that can be loosened in such a way that the components can move toward each other along said flank.

2. Multistep reduction-gear attachment as in claim 1, characterized in that the means (4 & 13) of attachment that secure the two angled components (3) of the gear box (2) together in such a way that they can move are screws (4) and slots (13) that extend along the components in the direction the components move in.

3. Multistep reduction-gear attachment as in claim 1, characterized in that the angled components (3) have recesses (15) that accommodate wall plates (14) that cover the sides of the gear box (2).

4. Multistep reduction-gear attachment as in claim 3, characterized in that the wall plates (14) that cover the sides of the gear box (2) are in the form of flaps and have hinge pins (16) that are to be mounted in the recesses (15) in the angled components (3).

5. Multistep reduction-gear attachment as in claim 1, characterized in that the angled components (3) of the gear box (2) or the wall plates (14) attached to them have bores or contours available to them so that they can accept other accessories as well.

6. Multistep reduction-gear attachment as in one of the foregoing claims, characterized in that not only the angled components (3) that constitute the gear box (2) but also the two belt wheels (10 & 11) and the wall plates (14) that cover the sides of the gear box (2) are similar to each other in shape.

* * * * *